United States Patent Office 3,708,440
Patented Jan. 2, 1973

3,708,440
RECLAIMING SCRAP POLYISOCYANURATE FOAM WITH AN ALIPHATIC DIOL AND A DIALKANOLAMINE
Floro F. Frulla, Wallingford, Alec Odinak, New Haven, and Adnan A. R. Sayigh, North Haven, Conn., assignors to The Upjohn Company, Kalamazoo, Mich.
No Drawing. Filed Feb. 14, 1972, Ser. No. 226,275
Int. Cl. C08g 53/22
U.S. Cl. 260—2.3                                          3 Claims

ABSTRACT OF THE DISCLOSURE

A process is disclosed for converting scrap polyisocyanurate foam into a polyol which can be used, without the need for any further treatment, as the polyol component in the preparation of polyurethane and related foams. The process comprises heating the scrap at about 175° C. to about 250° C. in the presence of a mixture of (a) an aliphatic diol having from 2 to 6 carbon atoms, inclusive, and a boiling point above about 180° C. and (b) a dialkanolamine having from 4 to 8 carbon atoms, inclusive, the dialkanolamine constituting from about 2 percent to about 20 percent by weight of the mixture.

BACKGROUND OF THE INVENTION (1) Field of the invention

This invention relates to the conversion of scrap polyisocyanurate to useful polyols and is more particularly concerned with a process for the conversion of scrap cellular polyisocyanurate to polyols and with the polyols so prepared.

(2) Description of the prior art

The rapid rate of growth of the polyurethane industry, particularly that section of it which is concerned with the manufacture of foam, has lead to a serious problem; namely, the difficulty of disposing of the waste polyurethane materials. An extension of this problem is posed by the current growth in the manufacture of polyisocyanurate foams which are preferred for thermal insulation because of their greater stability on exposure to high temperatures, as compared to polyurethane foams.

A number of methods have been described for the recovery and/or degradation of polyurethane waste products; see, for example, U.S. Pats. Nos. 2,937,151; 2,998,395; 3,117,940; 3,143,515; 3,300,417; 3,404,103; and 3,441,616. Unfortunately, none of these methods for the treatment of polyurethane foam has proved satisfactory when applied to the attempted recovery of useful products from polyisocyanurate foams.

We have now found that scrap polyisocyanurate foam can be converted to highly useful polyols by a process which is inexpensive and relatively easy to operate on a commercial scale, making the process of recovery an economically feasible one.

SUMMARY OF THE INVENTION

This invention comprises a process for the recovery of scrap polyisocyanurate foam in the form of a polyol which process comprises thermally treating said scrap polyisocyanurate at a temperature of about 175° C. to about 250° C. in the presence of a mixture of (a) an aliphatic diol having from 2 to 6 carbon atoms, inclusive, and having a boiling point above about 180° C. and (b) a dialkanolamine having from 4 to 8 carbon atoms, inclusive, the amount of said dialkanolamine present in said mixture being within the range of about 2 percent to about 20 percent by weight.

The invention also comprises the polyols obtained by the above process.

The term "aliphatic diol having from 2 to 6 carbon atoms, inclusive" means a diol of the formula

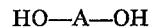

HO—A—OH wherein A is alkylene having the stated carbon atom content or alkylene interrupted in the chain thereof by an oxygen atom provided that the overall carbon atom content of the group is still within the stated limit.

The aliphatic diols employed in the process of the invention are those falling within the above definition which have the additional limitation that the boiling point thereof at atmospheric pressure (760 mm. of mercury) be above about 180° C. Illustrative of aliphatic diols having the above characteristics are ethylene glycol, 1,4-butanediol, 1,5-pentanediol, diethylene glycol, dipropylene glycol and the like.

The term "dialkanolamine having from 4 to 8 carbon atoms, inclusive" is inclusive of diethanolamine, diisopropanolamine, N - (2 - hydroxypropyl)ethanolamine, dipropanolamine, 3,3' - iminobis(2 - hydroxybutane) and the like.

DETAILED DESCRIPTION OF THE INVENTION

The process of the invention can be employed in the recovery of any polyisocyanurate, cellular or non-cellular. The polyisocyanurate, when treated in accordance with the invention, is converted substantially completely to an active hydrogen containing material which can be used, without further treatment, as the polyol component in the synthesis of polyurethanes and related materials.

In carrying out the process of the invention, the scrap polyisocyanurate is advantageously chopped or ground to particles of relatively small size in order to reduce the volume of the scrap and to assist in reducing the time necessary for the reaction to take place. When the amount of scrap polyisocyanurate is low compared with the amount of mixture of aliphatic diol and dialkanolamine to be used, the scrap, after pretreatment to reduce the particle size, can be admixed with the aliphatic diol and dialkanolamine at ambient temperature and then the mixture can be heated to a temperature within the above defined range. However, it is preferred, particularly when the proportion of scrap foam to diol is above about 10 percent by weight, that the aliphatic diol and dialkanolamine mixture be preheated to a temperature within the range defined above, and the scrap polyisocyanurate be added to the heated mixture. The addition of the scrap polyisocyanurate can be carried out in a single batch or preferably can be carried out portionwise over a period of time.

Once the mixture of scrap polyisocyanurate, aliphatic diol and dialkanolamine has been brought to a temperature within the above-defined range said mixture is maintained at a temperature within said range at least until all the scrap has dissolved and a homogeneous solution is obtained. The end point of the reaction can be detected by routine techniques, for example, by observing the rate of change of viscosity. In general, the period of heating necessary to recover the scrap foam as polyol will range from about 2 hours to about 8 hours depending upon the nature of the scrap polyisocyanurate and the diol and dialkanolamine employed. The most desirable reaction time for any particular combination can be determined by a process of trial and error.

When the reaction is complete, as determined by viscosity determination, infrared spectral analysis or like techniques, the reaction mixture is cooled, or allowed to cool, to room temperature. The product so obtained is ready, without any further treatment, for use as the polyol component in the preparation of polyurethane foams and the like.

In the case of the recovery of scrap foams which have been prepared using as a component a phosphorus containing polyol based on phosphoric acid, it is found that the polyol recovered in accordance with the process of the invention may contain significant amounts of acid-reacting material. Whenever such recovered polyols are to be used in a process in which a low acid number is desirable in the polyol, and the acid number of the recovered polyol is above the desirable limit, said recovered polyol can be treated by procedures known in the art to reduce the acid number. One of the most convenient ways of doing this is to react the recovered polyol with a sufficient amount of an alkylene oxide such as ethylene oxide, propylene oxide and the like to react with all the acid hydroxyls in the recovered polyol. The polyol treated in this way is then eminently suitable for use in situations in which a low acid number is desirable.

When the products of the process of the invention are used in the preparation of new polyurethanes, they can be used as the sole polyol in the reaction mixture required to make the new polyurethane or, alternatively, they can be blended with other polyols conventionally used in the preparation of polyurethanes. The methods and reactants employed to prepare polyurethanes, both cellular and noncellular, are so well known in the art that they need not be discussed herein.

The viscosity of the reaction product obtained in accordance with the process of the invention is largely governed by the particular diol, dialkanolamine, and scrap polyisocyanurate used and by the proportions in which they are used. Advantageously, the viscosity of the reaction product should be within the range of about 250 cps. to about 25,000 cps. measured at 25° C. in order to be particularly suited for use in the preparation of polyurethane foams. A viscosity in this range can be readily attained in the case of any particular diol, dialkanolamine, and scrap polyisocyanurate by a process of trial and error. Thus, in the case of diethylene glycol as the aliphatic diol, diethanolamine as the dialkanolamine, and a rigid polyisocyanurate foam as the scrap, viscosities in the above range are readily obtained by using approximately 25 to 40 parts by weight scrap foam for each 100 parts by weight of the mixture of diethylene glycol and diethanolamine.

The proportion of scrap polyisocyanurate to aliphatic diol and dialkanolamine can be varied over a wide range depending upon the viscosity of the reaction product which is ultimately desired. The upper limit of amount of scrap will vary according to the nature of the scrap and the diol/dialkanolamine mixture. In general, amounts up to about 40 parts by weight of scrap per 100 parts by weight of diol/dialkanolamine can be employed readily. Amounts of scrap in excess of the above proportion can be employed but tend to make the viscosity of the ultimate product unduly high.

While any of the aliphatic diols falling within the definition set forth above can be used in combination with a dialkanolamine, in the process of the invention, it is preferred to use diethylene glycol as the aliphatic diol in accordance with the process of the invention. In a particularly preferred embodiment of the process of the invention, a combination of diethylene glycol and approximately 5 percent by weight of diethanolamine has been found to be especially useful in carrying out the recovery of scrap polyisocyanurate.

The following examples describe the manner and process of making and using the invention and set forth the best mode contemplated by the inventors of carrying out the invention but are not to be construed as limiting.

EXAMPLE 1

The polyisocyanurate rigid foam employed as starting material in this example was prepared using the following ingredients and proportions:

| | |
|---|---|
| Polymethylene polyphenyl isocyanate [eq. wt.—141: viscosity 100 cps. at 25° C., containing approximately 45% methylenebis(phenyl isocyanate)] | 141 |
| Polyepoxide (tetrabromobisphenol - A - epichlorohydrin adduct: DER 542) | 30 |
| Polyester (chlorendic acid-trimethylolpropane ester prepared as described under Resin A of U.S. 3,214,392) | 23 |
| Trichlorofluoromethane | 28 |
| Dimethylaminomethylphenol (mixture of o- and p-isomer) | 7 |

The foam reaction ingredients were mixed using a standard foam metering and dispensing modulating unit. The polyisocyanate was fed as one stream to the mixing head and the remainder of the components were premixed and fed as a second stream. The rate of feeding of the two streams was maintained in the correct ratio to maintain the above proportions of reactants. The foam mix was dispensed to an appropriate mold and allowed to foam freely. The resulting foam was cured at room temperature (circa 25° C.) for several days.

A total of 200 g. of crushed polyisocyanurate foam (prepared as described above) was added slowly with stirring to a mixture of 285 g. of diethylene glycol and 15 g. of diethanolamine maintained at 200° C. The addition was made over a period of 4 hours. At the end of this time the mixture was heated with stirring for a further 2 hours at 200° C. and then cooled to room temperature. There was thus obtained a polyol having a viscosity of 16,380 cps. at 25° C. and a hydroxyl equivalent of 87.

A polyurethane foam was prepared by blending 30 parts by weight of the polyol obtained as described above with 38 parts by weight of a polypropoxylated polyamine having an equivalent weight of 151, 30 parts by weight of a phosphorus-containing polyol having an equivalent weight of 148, 2 parts of trimethylolpropane, 2 parts by weight of an organosilicone surfactant (L–5410), 0.4 part by weight of water, 0.6 part by weight of tetramethylguanidine, 0.4 part by weight of N,N,N',N'-tetramethylbutanediamine and 33 parts by weight of trifluorochloromethane. The resulting mixture was then admixed with 140 parts by weight of polymethylene polyphenyl polyisocyanate (eq. wt.=133) and the mixture so obtained was subjected to high speed mechanical stirring for ten seconds before being allowed to foam. The foam so obtained was cured at room temperature (circa 25° C.) for 3 days and then submitted to physical testing. The following results were obtained:

| | p.c.f. |
|---|---|
| Density | 2.06 |
| Compressive strength, p.s.i.: | |
|     Parallel to rise | 17.6 |
|     Vertical to rise | 10.9 |
| Flame retardance (ASTM D 1672) inches burned: | |
|     Maximum | 0.9 |
|     Minimum | 0.6 |
| Heat resistance oxygen index (ASTM D 2863–70) | 24.4 |

EXAMPLE 2

A total of 132 g. of crushed polyisocaynurate foam (prepared as described in Example 1) was added portionwise with stirring to a mixture of 380 g. of diethylene glycol and 20 g. of diethanolamine at 200° C. The addition was complete in 1.5 hours and the resulting mixture was maintained for an additional 2.5 hours at the same temperature before being cooled to room temperature. The product so obtained had a viscosity of 350 cps. at 25° C. and a hydroxyl equivalent of 69.

EXAMPLE 3

A total of 30 g. of a crushed polyisocyanurate foam (marketed as PIR by Bayer AG) was added portionwise over a period of 1 hour to a mixture of 95 g. of diethylene glycol and 5 g. of diethanolamine maintained at 200° C. with stirring. The resulting mixture was heated at the same temperature for a further 2.5 hours before being cooled to room temperature. There was thus obtained a polyol of viscosity 428 cps. at 25° C. and a hydroxyl equivalent weight of 74.

The above procedure was repeated using crushed polyisocyanurate foam marketed under the name HEX–P158–2 by Imperial Chemical Industries. There was thus obtained a polyol of viscosity 770 cps. at 25° C. and a hydroxyl equivalent weight of 77.5.

We claim:

1. A process for the recovery of scrap polyisocyanurate foam in the form of a polyol which comprises thermally treating said scrap polyisocyanurate at a temperature of about 175° C. to about 250° C. in the presence of a mixture of (a) an aliphatic diol having from 2 to 6 carbon atoms, inclusive, and having a boiling point above about 180° C. and (b) a dialkanolamine having from 4 to 8 carbon atoms, inclusive, the amount of said dialkanolamine present in said mixture being within the range of about 2 percent to about 20 percent by weight.

2. A process according to claim 1 wherein the aliphatic diol is diethylene glycol.

3. A process according to claim 1 wherein the mixture of aliphatic diol and dialkanolamine is a mixture of diethylene glycol and diethanolamine containing 5 percent by weight of the latter.

References Cited

UNITED STATES PATENTS

| | | | |
|---|---|---|---|
| 3,632,530 | 1/1972 | Kinoshita | 260—2.3 |
| 3,404,103 | 10/1968 | Matsudaira et al. | 260—2.3 |

SAMUEL H. BLECH, Primary Examiner

U.S. Cl. X.R.

260—2.5 AW, 835